(12) United States Patent  (10) Patent No.: US 8,250,406 B2
Dunstan  (45) Date of Patent: Aug. 21, 2012

(54) OPERATIONAL STATE PRESERVATION IN THE ABSENCE OF AC POWER

(75) Inventor: Robert A. Dunstan, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 1950 days.

(21) Appl. No.: 10/644,432

(22) Filed: Aug. 19, 2003

(65) Prior Publication Data
US 2005/0044447 A1 Feb. 24, 2005

(51) Int. Cl.
G06F 11/00 (2006.01)
(52) U.S. Cl. .......................................... 714/14
(58) Field of Classification Search .................. 714/14, 714/22, 32
See application file for complete search history.

(56) References Cited

U.S. PATENT DOCUMENTS

| 4,763,333 A | * | 8/1988 | Byrd ............................. 714/22 |
| 4,851,987 A | | 7/1989 | Day |
| 5,083,266 A | | 1/1992 | Watanabe |
| 5,201,059 A | | 4/1993 | Nguyen |
| 5,315,533 A | * | 5/1994 | Stich et al. ................... 700/298 |
| 5,317,752 A | * | 5/1994 | Jewett et al. .................. 714/14 |
| 5,386,552 A | | 1/1995 | Garney |
| 5,396,637 A | * | 3/1995 | Harwell et al. ................ 365/228 |
| 5,410,713 A | * | 4/1995 | White et al. ................... 713/330 |
| 5,414,861 A | * | 5/1995 | Horning ........................ 365/229 |
| 5,511,204 A | * | 4/1996 | Crump et al. .................. 713/330 |
| 5,513,359 A | * | 4/1996 | Clark et al. .................... 713/323 |
| 5,551,043 A | * | 8/1996 | Crump et al. .................. 713/323 |
| 5,592,675 A | | 1/1997 | Itoh |
| 5,638,541 A | | 6/1997 | Sadashivaiah |
| 5,649,213 A | | 7/1997 | Kurihara |
| 5,708,820 A | * | 1/1998 | Park et al. ..................... 713/323 |
| 5,710,911 A | * | 1/1998 | Walsh et al. ................... 713/500 |
| 5,710,931 A | | 1/1998 | Nakamura |
| 5,715,464 A | * | 2/1998 | Crump et al. .................. 713/323 |
| 5,804,890 A | * | 9/1998 | Kakalec et al. ................. 307/64 |
| 5,832,280 A | * | 11/1998 | Swanberg ..................... 713/300 |
| 5,875,120 A | | 2/1999 | Matsushima |
| 5,889,933 A | * | 3/1999 | Smith ........................... 714/22 |
| 5,900,026 A | | 5/1999 | Ryu |
| 5,903,766 A | | 5/1999 | Walker et al. |
| 5,944,828 A | * | 8/1999 | Matsuoka ...................... 713/323 |
| 6,052,793 A | * | 4/2000 | Mermelstein .................. 713/340 |

(Continued)

FOREIGN PATENT DOCUMENTS

CN 1402106 3/2003

(Continued)

OTHER PUBLICATIONS

"Advanced Configuration and Power Interface Specification," Compaq Computer Corporation, et al., Revision 2.0c, Oct. 30, 2003, pp. ii-562.

(Continued)

Primary Examiner — Bryce Bonzo
(74) Attorney, Agent, or Firm — Schwabe, Williamson & Wyatt, P.C.

(57) ABSTRACT

A system is provided with the ability to intervene, when a suspend process is initiated in response to an AC failure condition to place the system in a suspended to memory state, to save a persistent copy of an operational state of the system, before allowing the suspend process to complete.

15 Claims, 8 Drawing Sheets

U.S. PATENT DOCUMENTS

| | | | |
|---|---|---|---|
| 6,112,309 A | 8/2000 | Inoue | |
| 6,195,754 B1 * | 2/2001 | Jardine et al. | 713/324 |
| 6,243,831 B1 * | 6/2001 | Mustafa et al. | 714/24 |
| 6,266,776 B1 | 7/2001 | Sakai | |
| 6,272,630 B1 * | 8/2001 | Chen et al. | 713/2 |
| 6,274,979 B1 | 8/2001 | Celii et al. | |
| 6,324,651 B2 * | 11/2001 | Kubik et al. | 713/323 |
| 6,389,556 B1 * | 5/2002 | Qureshi | 714/15 |
| 6,523,125 B1 | 2/2003 | Kohno | |
| 6,601,181 B1 * | 7/2003 | Thomas | 713/340 |
| 6,618,813 B1 * | 9/2003 | Hsu et al. | 713/323 |
| 6,901,298 B1 * | 5/2005 | Govindaraj et al. | 700/21 |
| 7,131,011 B2 | 10/2006 | Westerinen et al. | |
| 7,197,654 B2 | 3/2007 | Olsen | |
| 7,228,444 B2 | 6/2007 | Westerinen et al. | |
| 2002/0073358 A1 | 6/2002 | Atkinson | |
| 2004/0039960 A1 * | 2/2004 | Kassayan | 714/14 |
| 2004/0070371 A1 | 4/2004 | Chern et al. | |
| 2004/0073818 A1 * | 4/2004 | Cheok et al. | 713/300 |
| 2004/0088589 A1 * | 5/2004 | Westerinen et al. | 713/300 |

FOREIGN PATENT DOCUMENTS

| | | |
|---|---|---|
| EP | 0766167 | 4/1997 |
| EP | 0 805 386 A1 | 11/1997 |
| EP | 1229430 | 8/2002 |
| EP | 1351146 | 10/2003 |
| JP | 08-297530 | 11/1996 |
| JP | 09-128106 | 5/1997 |
| JP | 10-207588 | 8/1998 |
| JP | 11-338640 | 12/1999 |

OTHER PUBLICATIONS

Advanced Power Management, BIOS Interface Specification, Revision 1.2, Feb. 1996, Intel Corporation and Microsoft Corporation.

"Advanced Configuration and Power Interface Specification," Compaq Computer Corporation, et al., Revision 2.0c, Oct. 30, 2003, pp. 26-44.

"Advanced Configuration and Power Interface Specification", Compaq Computer Corporation et al., Revision 2.0, Aug. 25, 2003.

"Computer Information Protect Control Device", Derwent Publications Ltd., London, AN-2003-431507, XP-002311521.

* cited by examiner

OPERATIONAL STATE PRESERVATION IN THE ABSENCE OF AC POWER

BACKGROUND

Advances in integrated circuits and microprocessor technologies have made possible the availability of computing devices, such as personal computers, with computing power that was once reserved for "main frames". As a result, increasingly computing devices, such as personal computers, are being used for a wide array of computations, and often, "important" computations.

However, computing devices, such as personal computers, are still being provided without integral backup power support. Further, unlike their server brethrens, typically, supplemental external backup power supports are seldom employed. Thus, whenever the power supply fails, these computing devices go into an un-powered state, and the system states are lost.

For those computing devices endowed with power management implemented in accordance with the Advanced Configuration and Power Interface (ACPI) (jointly developed by Hewlett Packard, Intel, et al), the computing devices are said to be in the "un-powered" G3 state.

Moreover, when power is restored, and a user presses the power button of the computing device, the user typically gets a number of messages from the operating system (OS) of the computing device. Unfortunately, many of these messages are understood by sophisticated users only. Examples of these messages include asking the user whether the user desires to boot the computing device into a safe mode, have the disk drive scanned, and so forth.

If acceptance of computing devices, such as personal computers, is to continue to expand, and the computing devices are to be used by more and more users for an increasing variety of applications, such as "entertainment" applications, it is necessary for their usability, availability, and/or reliability to continue to improve. Thus, a need exists to improve the ability of a computing device, such as a personal computer, to handle power failures.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to method for saving a persistent copy of system state of a system when AC fails, BIOS equipped to facilitate practice of the method, power supply equipped to signal AC failure, and components, circuit boards or devices endowed with all or portions of the BIOS and the power supply.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
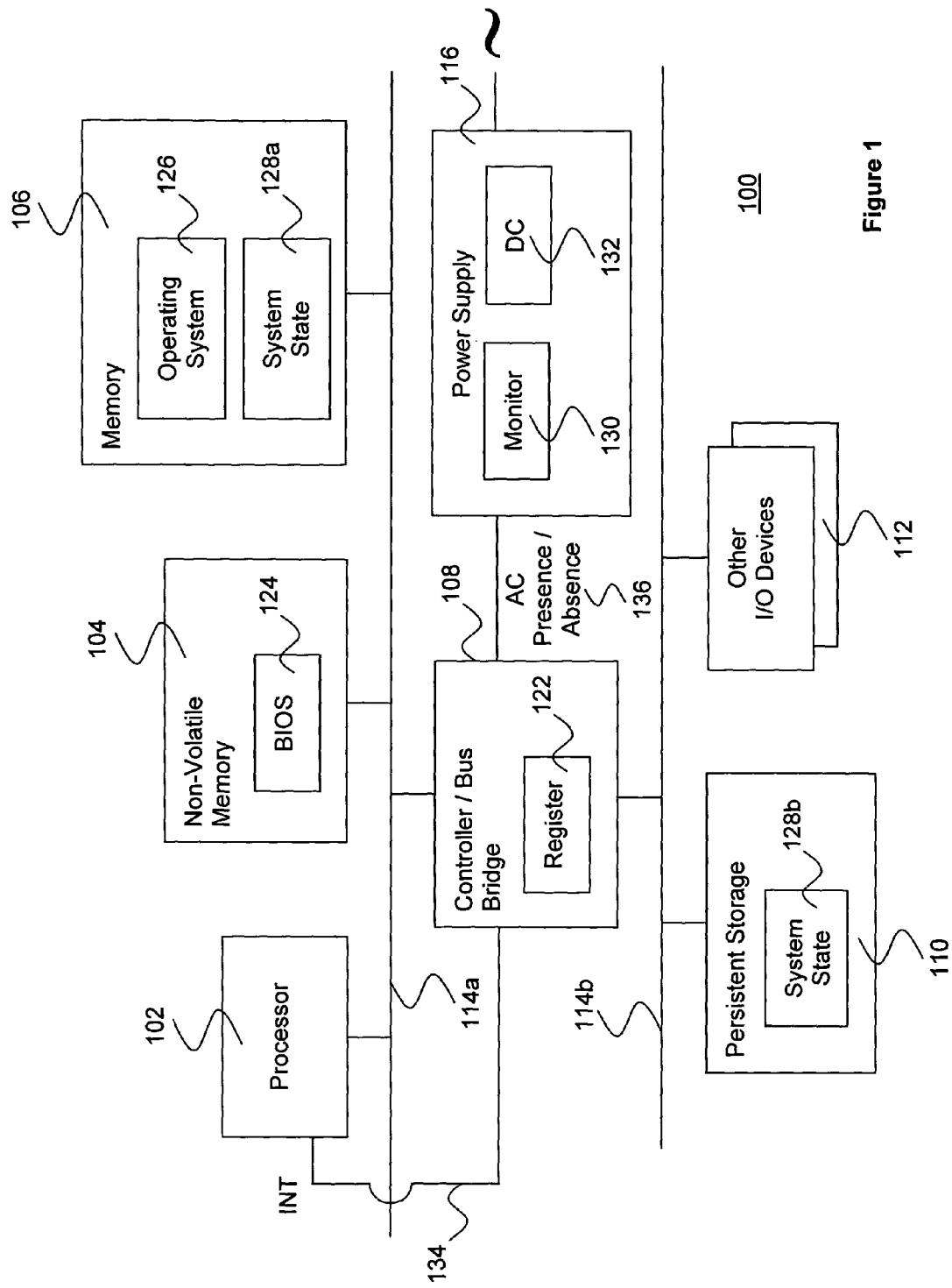
FIG. 1 illustrates an overview of a system incorporated with the teachings of one embodiment of the present invention, including a BIOS equipped to save a persistent copy of the system state when the system suspends to memory in response to an AC absence condition.

Referring now to FIG. 1 wherein an overview of a system incorporated with the teachings of one embodiment of the present invention is illustrated. For the embodiment, system 100 includes processor 102, non-volatile memory 104, memory 106, controller/bus bridge 108, persistent storage 110, other I/O devices 112, buses 114a-114b, and power supply 116, coupled to each other as shown. Controller/bus bridge 108 will also be referred to as memory and I/O controller/bus bridge, or MCH/ICH/BB.

Processor 102 includes in particular a terminal (e.g. a pin) to receive an interrupt 134. Non-volatile memory 104 includes in particular basic input/output system (BIOS) 124 equipped with the teachings an embodiment of the present invention. Memory 106 includes a working copy of operating system (OS) 126 and system state including applications and data 128*a*. OS 126 is equipped to initiate a suspend process to cause system 100 to go into a "suspended to memory" state.

MCH/ICH/BB 108 is equipped to interrupt processor 102, when system 100 is in an active state and an AC failed or absent condition arises. More specifically, for the embodiment, the interrupt is issued by the ICH portion of MCH/ICH/BB 108. MCH/ICH/BB 108 further includes in particular register 122 to facilitate OS 126 to cause system 100 to go into the "suspended to memory" state. Further, MCH/ICH/BB 108 is equipped to shut off delivery of "normal" power (leaving only standby power) to cause system 100 to go into a "suspended to memory" state. MCH/ICH/BB 108 is also equipped to process device wake events, including a notification of AC re-presence while system 100 is in a suspended to memory state. In particular, MCH/ICH/BB 108 is equipped to allow resumption of delivery of "normal" power, initiate waking of system 100, and facilitate BIOS to initiate a resume process. Similarly, for the embodiment, processing of device wake events is performed at the ICH portion MCH/ICH/BB 108. [AC=Alternating Current.]

Power supply 116 includes integral backup DC power source 132, to source power for system 100 while system 100 is in an AC failed or absent condition, and a monitor 130 equipped to signal 136 presence or absence of AC power at power supply 116. An example of integral backup DC power source 132 is a battery. For the purpose of present application, the terms "AC failed", "AC absent" and other variants should be considered synonymous, unless the context clearly indicates to the contrary. Hereinafter, integral backup DC power source 132 may also be simply referred to as either backup power source or DC power source. Further, in alternate embodiments backup power source may be a non-DC power source. [DC=Direct Current.]

Persistent storage 110 is employed to store, among other things, a persistent copy of system state including applications and data 128*b* when system 100 goes into the "suspended to memory" state. The term "system state" as used herein includes OS and application states and data.

Resultantly, system 100 may be advantageously maintained in a "suspended to memory" state (by the DC power source) for at least a critical period, even when AC power is lost, to allow a persistent copy of the system state to be saved. Further, system 100 may be smoothly brought back to the saved system state, when AC power returns.

Thus, system 100 may offer its user, usability experience that is similar to that of conventional consumer electronic devices, such as televisions. For example, from the user's perspective, a television "remembers" the last channel the television was tuned to, and is powered on tuning to the particular channel. By virtue of the teachings incorporated, embodiments of system 100 may likewise exhibit the same "remembering" behavior, turning on to its last state, after it has been "turned off", from the user's perspective.

Still referring to FIG. 1, except for teachings of embodiments of the present invention incorporated, processor 102, non-volatile memory 104, memory 106, MCH/ICH/BB 108, persistent storage 110, I/O devices 112, and buses 114*a*-114*b* all represent corresponding broad ranges of these elements. In particular, an example of an I/O device is a networking interface. Similarly, except for the teachings of an embodiment of the present invention incorporated, BIOS 124 and OS 126 also represent corresponding broad ranges of the elements.

Various embodiments of these teachings incorporated in BIOS 124, power supply 116, the operational states and various operational flows of system 100, as well as the manner these elements cooperate to provide the improvement will be described in turn below.

In various embodiments, system 100 may be a desktop computer, a set-top box, an entertainment control console, a video recorder, a video player or other processor based devices of the like.

Further, alternate embodiments may be practiced without some of the enumerated elements or with other elements. In particular, alternate embodiments may be practiced without DC power source 132 being an integral part of system 100. That is, for these embodiments, DC power is provided from a source external to system 100.

Figure 2A:
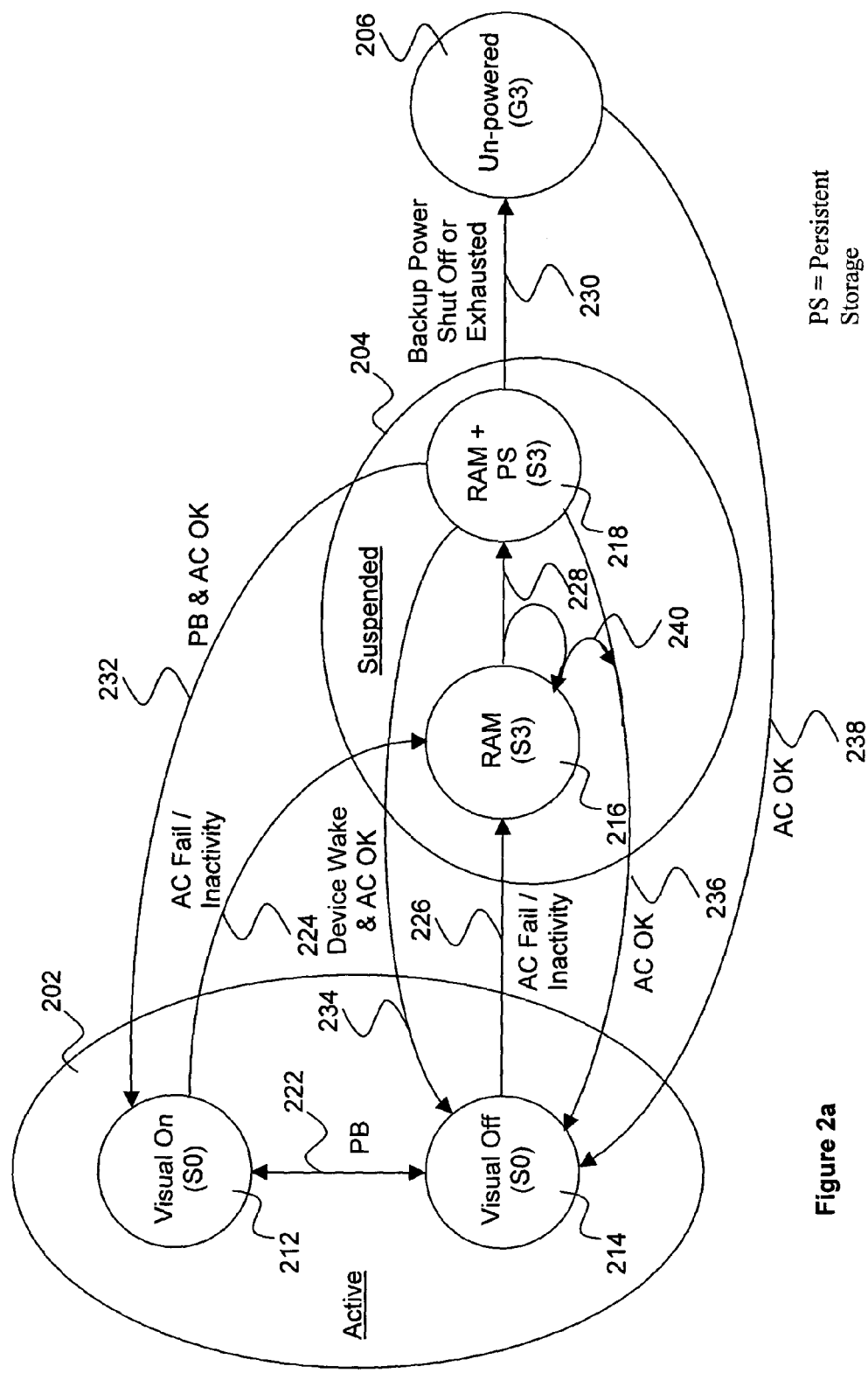
FIG. 2a illustrates the operational states of the system of FIG. 1, in accordance with one embodiment, including the suspended to memory state with a persistent copy of the system state saved.

FIG. 2*a* illustrates one embodiment of the operational states of system 100. For ease of understanding, the operational states will be described assuming system 100 also includes implementation of ACPI, and mapped to the ACPI states. For the embodiment, the operational states of system 100 include three major operational states, active state (ACPI S0 or simply, S0) 202, suspended state (ACPI S3 or simply, S3) 204 and un-powered state (ACPI G3 or simply G3) 206. However, alternate embodiments may be practiced without mapping to ACPI states or implementation of ACPI. For further information on ACPI including ACPI states, see The ACPI Specification, Revision 2.0b.

Within active state (S0) 202, system 100 may be in "visual on" state 212, or "visual off" state 214. While system 100 is in "visual on" state 212, user perceptible indications of system activity may be selectively activated as appropriate, including but are not limited to display devices, light emitting diodes (LEDs), speakers, and so forth. On the other end, while system 100 is in "visual off" state 214, all visual and aural elements of system 100 are "off", giving a user the impression that system 100 has been "turned off". As illustrated, system 100 may transition between "visual on" state 212 and "visual off" state 214 based at least in part on power button (PB) events 222.

Having visual "on" and "off" states 212 and 214 within active state (S0) 202 is a non-essential aspect of the disclosed embodiments of the present invention. The feature is the subject matter of co-pending U.S. patent application, Ser. No. 10/644,978, entitled Method, Apparatus And System For Operating Data Processing Devices, and filed contemporaneously. For further details, see the co-pending application.

Still referring to FIG. 2*a*, for the embodiment, within suspended state (S3) 204, system 100 may be in "suspended to memory" state 216 or "suspended to memory with a persistent copy of the system state saved" state 218. System 100 may enter into "suspended to memory" state 216 from either "visual on" state 202 or "visual off" state 204, due to e.g. "inactivity", user instruction, or an "AC failure" condition, 224 and 226. System 100 is considered to be in the "AC failure" condition, whenever AC is not present at power supply 116. Further, by virtue of the teachings provided, system 100 automatically saves a persistent copy of the then system state, and enters into "suspended to memory with a persistent copy of the system state saved" state 218.

For the embodiment, the system state saving process may be interrupted, e.g. by the resumption of AC power. As will be described in more detail below, the system state saving process is "aborted", and the suspend process is allowed to proceed to completion (first portion of transition 240), resulting in system 100 entering suspended to memory state 216. At which time, system 100 immediately transitions back to visual off state 214, (remaining portion of transition 240).

From "suspended to memory with a persistent copy of the system state saved" state 218, system 100 may enter un-powered state (G3) 206 if the integral DC power source is shut off or exhausted 230. Shutting the DC power source off after a time period to prevent it from being exhausted is also not an essential aspect of the disclosed embodiments of the present invention. The feature is the subject matter of co-pending U.S. patent application, Ser. No. 10/644,683, entitled "Automatic Shut Off of DC Power Source in the Extended Absence of AC Power", and filed contemporaneously. For further details, see the co-pending application.

From "suspended to memory with a persistent copy of the system state saved" state 218, system 100 may transition back to either "visual on" state 212 or "visual off" state 214 in response to AC re-present in system 100 or a power button/device wake event 232/234 if AC is present (state 218 was entered due to inactivity). In various embodiments, the latter transitions are permitted only if AC is present at power supply 116 (state 218 was entered due to inactivity), else the power button or device wake events are suppressed or ignored.

Suppressing or ignoring power button and device wake events when AC is absent, is also not an essential aspect of the disclosed embodiments of the present invention. The feature is the subject matter of co-pending U.S. patent application, Ser. No. 10/644,628, entitled "Power button and Device wake events Processing Methods in the Absence of AC Power", and filed contemporaneously.

Further, system 100 returns to "visual off" state 214 if AC becomes present again while system 100 is in "un-powered" state (G3) 206.

Figure 2B:
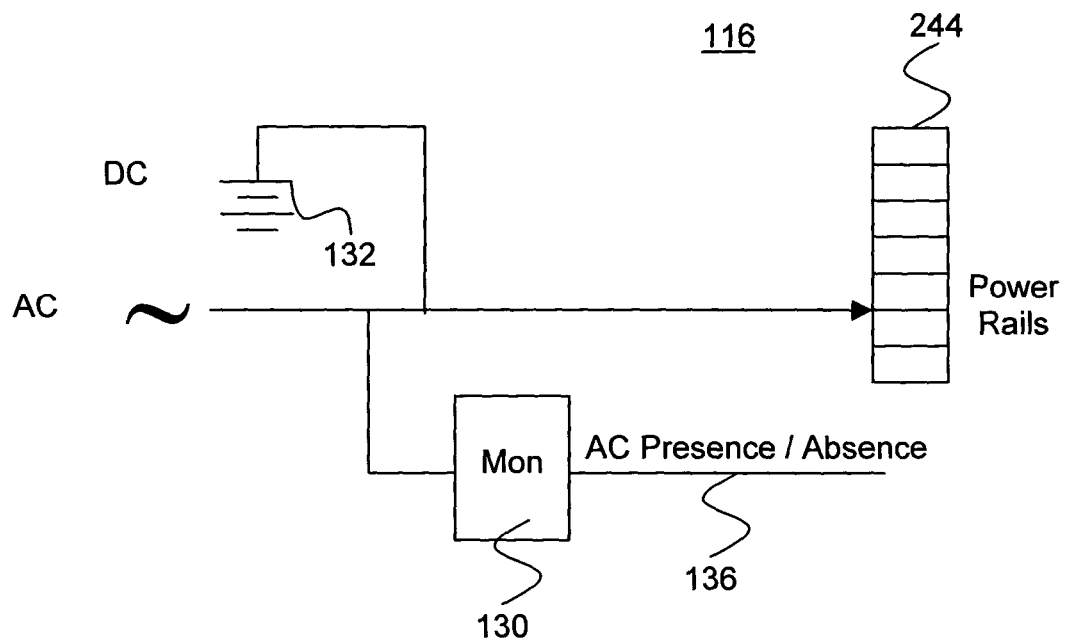
FIG. 2b illustrates one embodiment of the power supply of FIG. 1 in further details, including a monitor for monitoring presence/absence of AC and a DC power source.

Referring now to FIG. 2b, wherein one embodiment of power supply 116 is illustrated. As shown, for the embodiment, power supply 116 includes integral backup DC power source 132 and monitor 130 as described earlier. Additionally, power supply 116 includes multiple power outputs (also referred to as power rails) 244. The elements are coupled to each other as shown.

Accordingly, power outputs 244 may continue to supply power to elements of system 100, drawing on integral DC power source 132, in the absence of AC at power supply 116. Further, monitor 130 is able to output a signal denoting whether AC is present or absent at power supply 116 at any point in time.

In various embodiments, DC power source 132 may be a battery. Monitor 130 may be implemented employing a diode and RC coupled to a comparator to provide signal 136. Further, a logical "1" of signal 136 denotes AC present at power supply 116, whereas a logical "0" of signal 136 denotes AC absent at power supply 116.

In various embodiments, power outputs 244 may include normal and standby power outputs. Normal power outputs may include +12 v, +5 v, +3 v, and −12 v, whereas standby power output may include +5 v. Further, normal power outputs or its delivery may be turned off.

Figure 2C:
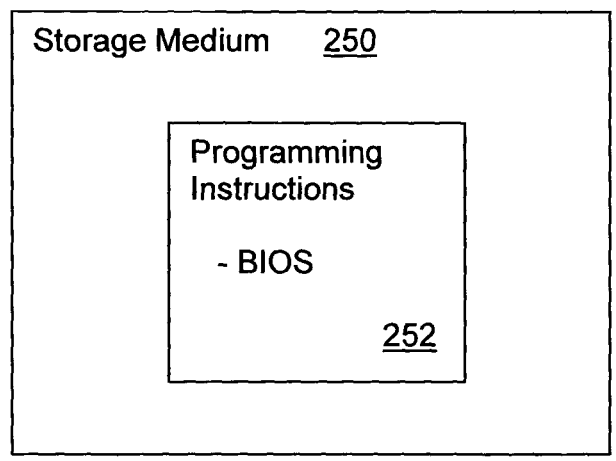
FIG. 2c illustrates an example article having programming instructions implementing all or the relevant portions of the BIOS of FIG. 1, in accordance with one embodiment.

FIG. 2c illustrates an example article having programming instructions implementing all or the relevant portions of BIOS 124 of FIG. 1, in accordance with one embodiment. As illustrated, article 250 includes a storage medium 252 and programming instructions 252 implementing all or the relevant portions of BIOS 124 of FIG. 1. As alluded to earlier and to be described in more detail below, BIOS 124 includes teachings of one embodiment of the present invention to facilitate preservation of operational state of system 100 when it is in an "AC failed" condition.

For the embodiment, article 250 may be a diskette. In alternate embodiments, article 250 may be a compact disk (CD), a digital versatile disk (DVD), a tape, a compact Flash, or other removable storage device of the like, as well as a mass storage device, such as a hard disk drive, accessible for downloading all or the relevant portions of BIOS 124 via e.g. a networking connection.

Figure 3A:
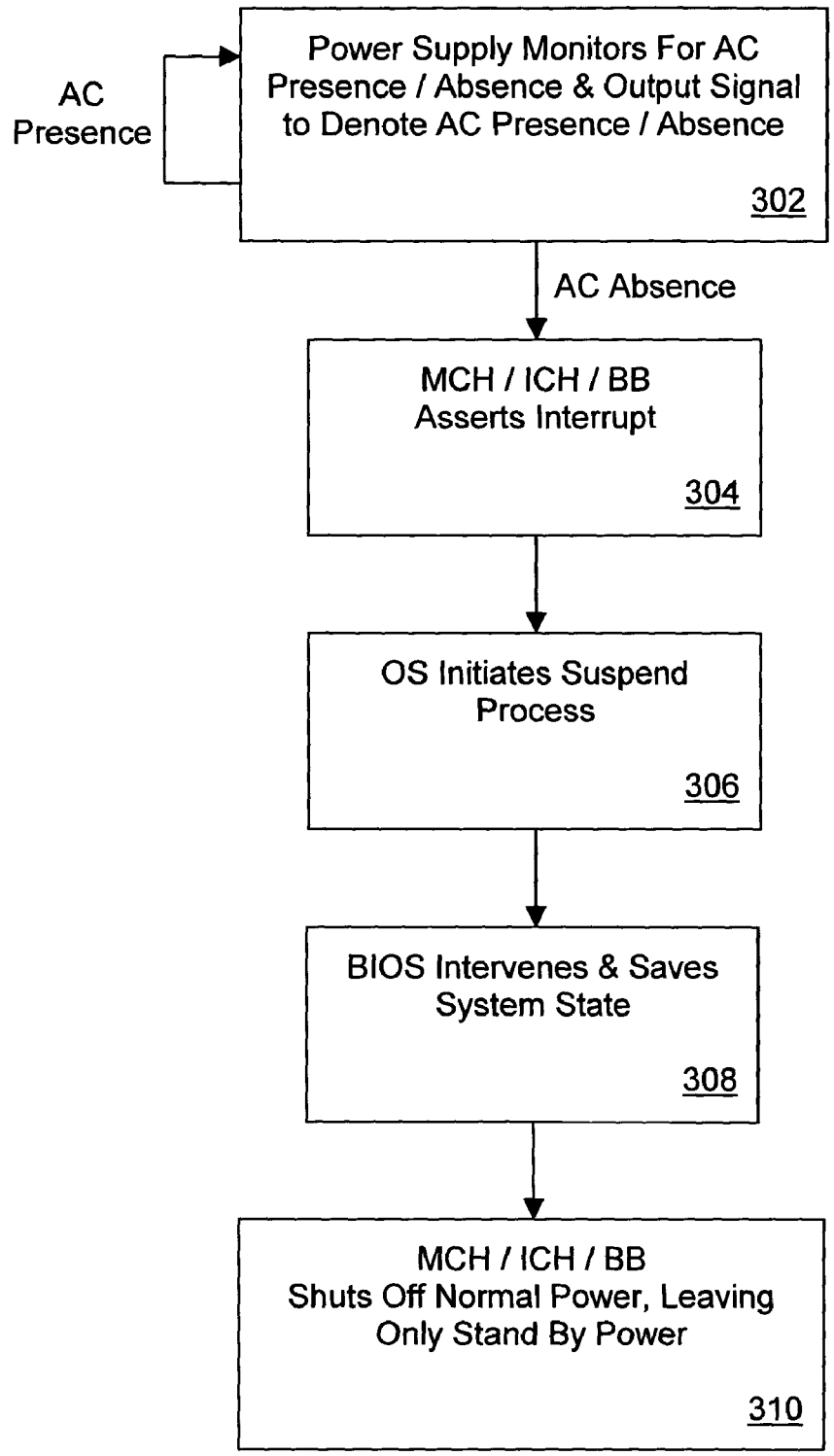
FIG. 3a illustrates one embodiment of the relevant operation flow of the system to suspend the system to memory in responding to an AC absence condition, while operating in an active state, including the BIOS intervening to save a persistent copy of the system state.

FIG. 3a illustrates one embodiment of the relevant operation flow of system 100 to suspend system 100 in memory in responding to an AC failure condition, while operating in active state 202.

As illustrated, while operating in active state 202, power supply 116 monitors for AC presence or absence, and outputs a signal to denote AC presence or absence accordingly, block 302. In alternate embodiments, the monitoring and signaling of AC presence or absence at power supply 116 may be performed by another element other than power supply 116. Regardless, the monitoring and signaling continues as long as AC is present at power supply 116.

However, when AC fails or absents from power supply 116, and monitor 130 outputs a signal so denoting, for the embodiment, MCH/ICH/BB 108 asserts an interrupt, notifying processor 102 of the AC failure or absence condition, block 304. For the purpose of this application, the terms "AC failure" and "AC absent" are synonymous. In various embodiments, as described earlier, the interrupt is asserted by the ICH portion of MCH/ICH/BB 108.

For the embodiment, in response to the interrupt, processor 102 switches execution to a portion of OS 126 (interrupt handler), which responds by initiating a suspend to memory process, block 306. More specifically, OS 126 attempts to write to register 122 of MCH/ICH/BB 108 to cause MCH/ICH/BB 108 to shut off delivery of the normal power outputs of power supply 116, and make available only the standby power output for a small number of elements, such as memory 106.

For the embodiment, system 100 is equipped, and initialized to generate an interrupt to transfer control to a designated interrupt handler of BIOS 124 in response to the OS write. In various implementations, the interrupt may be the unmaskable System Management Interrupt (SMI).

Accordingly, for the embodiment, BIOS 124 is able to intervene in the suspend to memory process, and save a persistent copy of the then system state in a persistent storage device, such as a hard disk drive, block 308. Upon saving the persistent copy of the then system state in a persistent storage device, BIOS 124 completes the OS write to register 122 of MCH/ICH/BB 108, block 308.

In one embodiment where automatic shut off of backup power source 132 after a period of time is supported, in block 308, BIOS 124 also sets up an arrangement to subsequently shut off backup power source 132 after elapse of the time period, before completing the OS write to register 122 of MCH/ICH/BB 108. See copending application 10/644,683 for further details.

As described earlier, the action of writing to register 122 causes delivery of the normal power outputs of power supply 116 to be shut off by MCH/ICH/BB 108, and leaving only delivery of the standby power output for a small number of elements, such as memory 106, block 310.

Thus, in response to the OS initiation to place system 100 in the "suspended to memory" state 216, system 100 is advantageously placed in the "suspended to memory with a persistent copy of the system state saved" state 218 instead. System 100 may later be smoothly brought back to an active state when AC power returns.

Still referring to FIG. 3a, additionally, as described earlier, BIOS 124 may be interrupted while saving a persistent copy of the system state, e.g. by the resumption of AC power. At such time, for the embodiment, BIOS 124 "aborts" the saving operation, and proceeds immediately to complete the suspend process, block 308, resulting in system 100 entering suspended to memory state 216 (first portion of transition 240).

At which time, system 100 immediately transitions back to visual off state 214 (remaining portion of transition 240). This process is similar to the process to be described later referencing FIG. 4, for transitioning from suspended state 218 to visual off state 214.

Figure 3B:
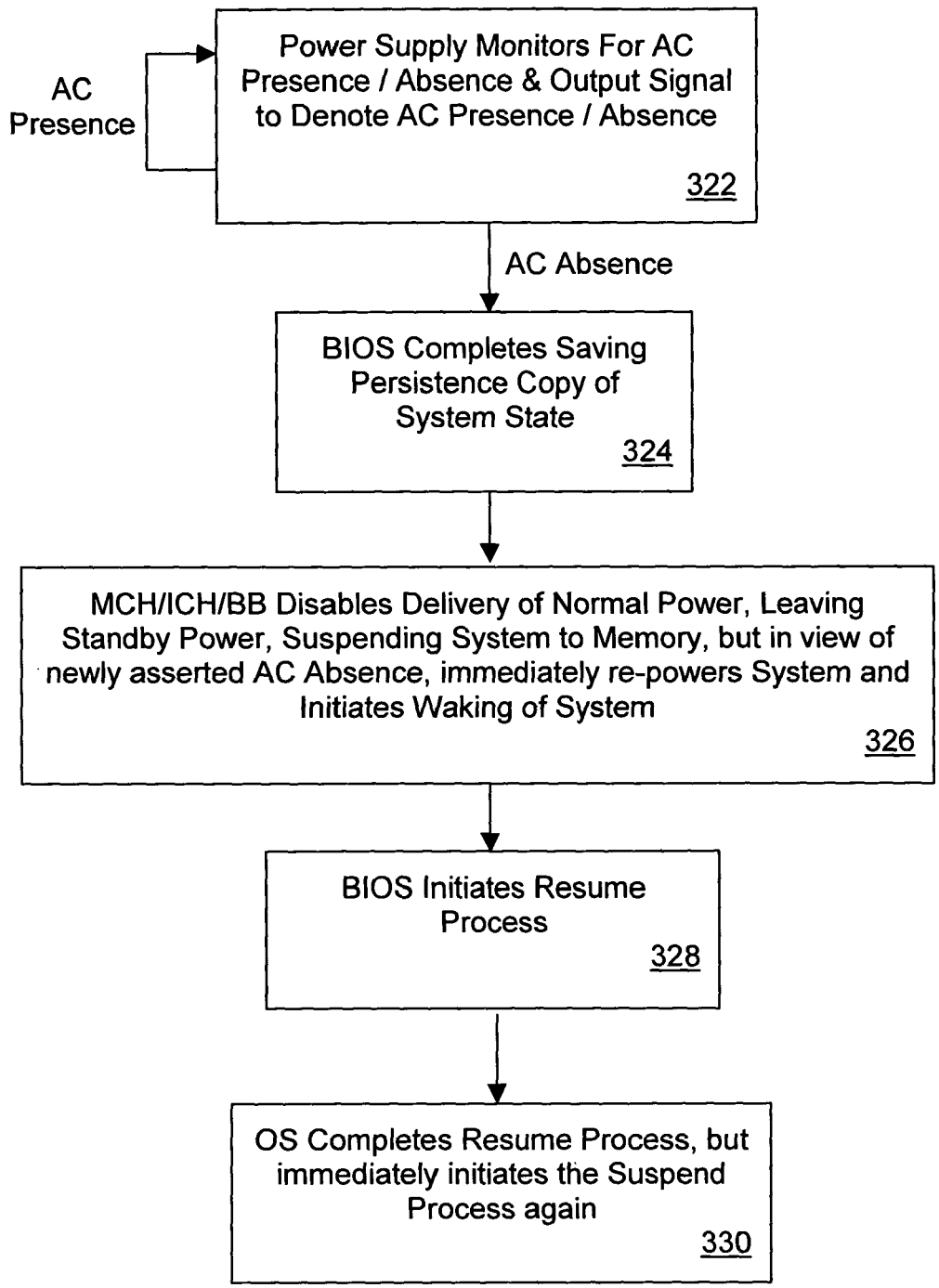
FIG. 3b illustrates one embodiment of the relevant operation flow of the system in responding to an AC absence condition, while BIOS is saving a persistent copy of the system state as part of a suspend process initiated due to a reason other than AC absence.
Figure 3C:
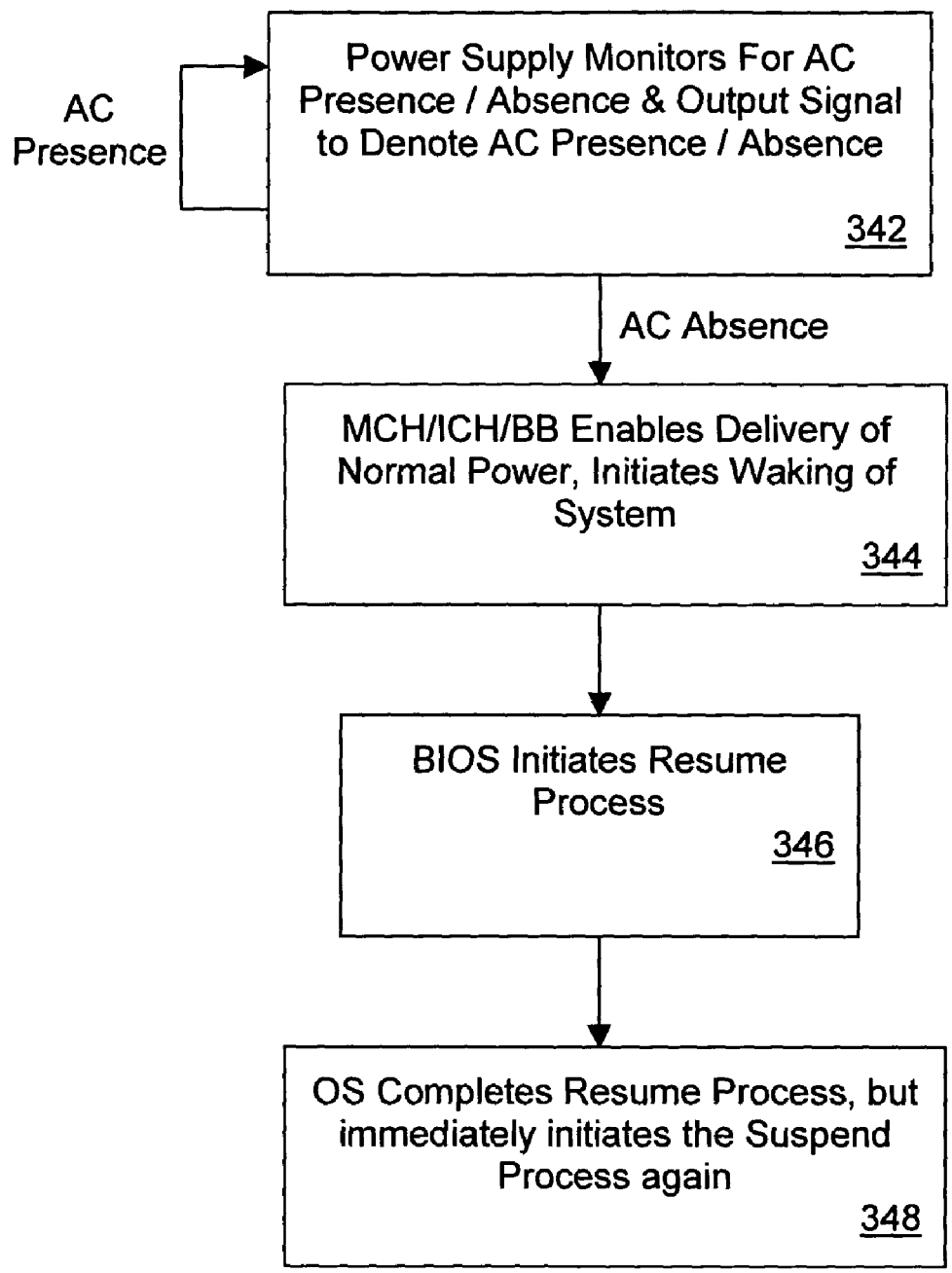
FIG. 3c illustrates one embodiment of the relevant operation flow of the system in responding to an AC absence condition, while the system is suspended to memory due to a reason other than AC absence.

Referring now to FIGS. 3b and 3c, additionally, AC failure or absence may also occur while BIOS 124 is saving the persistent copy of the system state, or after BIOS 124 has completed the saving process, and system 100 is in "suspended" state 218. The saving process is part of a suspend process initiated due to a reason other than AC failure, e.g. inactivity. FIG. 3a-3b illustrate one embodiment each of the relevant operation flow of system 100 in responding to an AC failure condition arisen under each of the foregoing described situations respectively.

As illustrated in FIG. 3b, for the former case (i.e. AC failure while BIOS 124 is saving a persistent copy of the system state as part of a suspend process initiated due to a reason other than AC failure), notwithstanding the signaling of the AC failure condition, block 322, BIOS 124 proceeds to complete the saving of the persistent copy of the system state, and thereafter, continues the suspend process, block 324. Note that at this point in time, system 100 is powered by backup power source 132.

Next, MCH/ICH/BB 108 shuts off delivery of normal power, leaving only standby power, thereby placing system 100 in suspended state 218, as described earlier, block 326. However, MCH/ICH/BB 108 immediately re-enables delivery of normal power, and initiates waking of system 100, block 326.

In response, BIOS 124 initiates hardware elements and a resume process, using e.g. a resume vector previously set up by OS 126, block 328.

At block 330, OS 126 completes the resume process. However, OS immediately re-initiates another suspend process, in view of the AC failure condition, leading to the process earlier described referencing FIG. 3a being performed.

FIG. 3c illustrates one embodiment of the relevant operation flow of system 100 (equipped with the shut off feature) in responding to an AC failure condition arisen while system 100 is in suspended state 218.

As illustrated in FIG. 3c, for the latter case (i.e. AC failure after BIOS 124 has completed saving a persistent copy of the system state as part of a suspend process initiated due to a reason other than AC failure), when AC re-presence is signaled, block 342, MCH/ICH/BB 108 resumes delivery of normal power, and initiates a system wake process, block 344.

In response, similar to the process of FIG. 3b, BIOS 124 initiates hardware elements and a resume process, block 346. Thereafter, at block 348, OS completes the resume process as described earlier. However, OS immediately re-initiates another suspend process, in view of the AC failure condition, leading to the process earlier described referencing FIG. 3a being performed.

Each of the foregoing embodiments of FIGS. 3b and 3c (for responding to AC absence when BIOS 124 is saving or has completed saving a persistent copy of the system state as part of a suspend process initiated due to e.g. inactivity) has been described employing an approach that resumes to OS 126 to re-initiate another suspend process. However, alternate embodiment may be practiced without resuming to OS 126. For example, BIOS 124 may be further equipped to maintain sufficient information to recognize that system 100 is being awaken because AC failed when BIOS 124 was saving or had completed saving a persistent copy of the system state as part of a suspend process initiated due to e.g. inactivity. Moreover, BIOS 124 is further equipped to proceed to perform the operations it normally performs (as earlier described referencing FIG. 3a) during a suspend process initiated due to AC failure, upon so recognizing the cause for system 100 being awaken.

Figure 4:
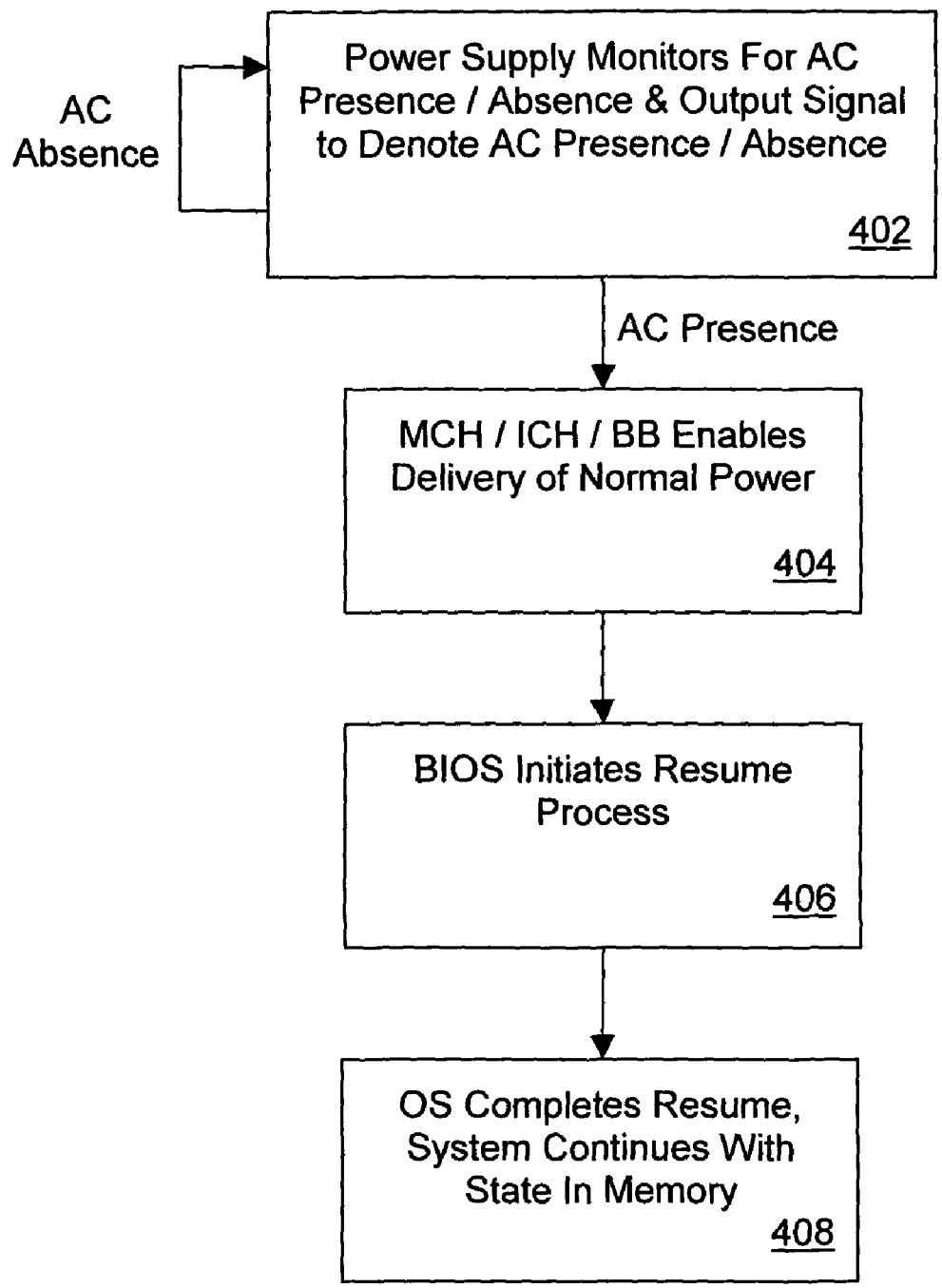
FIG. 4 illustrates one embodiment of the relevant operation flow of the system to resume the system in an active state, in responding to an AC re-presence condition, while operating from the backup power source in a suspended to memory state.

FIG. 4 illustrates the relevant operation flow of system 100 to resume system 100 into an active state, in responding to an AC re-presence condition, while operating from the DC power source in suspended state 218. Recall from earlier description, for the embodiment, suspended state 218 is the "suspended to memory with a persistent copy of the system state saved" state.

As illustrated, for the embodiment, while operating from the DC power source 132 in "suspended to memory with a persistent copy of the system state saved" state 218, power supply 116 monitors for AC presence or absence, and outputs a signal to denote AC presence or absence accordingly, block 402. Again, as described earlier, in alternate embodiments, the monitoring and signaling of AC presence or absence at power supply 116 may be performed by another element other than power supply 116. Regardless, the monitoring and signaling continues as long as AC is absent at power supply 116.

However, when AC is re-present at power supply 116, and monitor 130 outputs signal 136 so denoting. For the embodiment, MCH/ICH/BB 108 responds to signal 136 as a device wake event, re-enabling delivery of normal power outputs of power supply 116 to elements of system 100, and then transfers control to BIOS 124, block 404. As described earlier, in various embodiments, the device wake event is processed by the ICH portion of MCH/ICH/BB 108.

At block 406, BIOS 124 performs various initializations of hardware elements as appropriate, and transfers control to a resume vector previously set up by OS 126 (as part of the suspend to memory process). For embodiments with the backup power shut off feature, BIOS 124 may also additionally cancel any scheduled shut off.

At block 408, OS 126 completes the resume process, and system 100 continues operation, starting from the previously suspended system state in memory 106.

Figure 5:
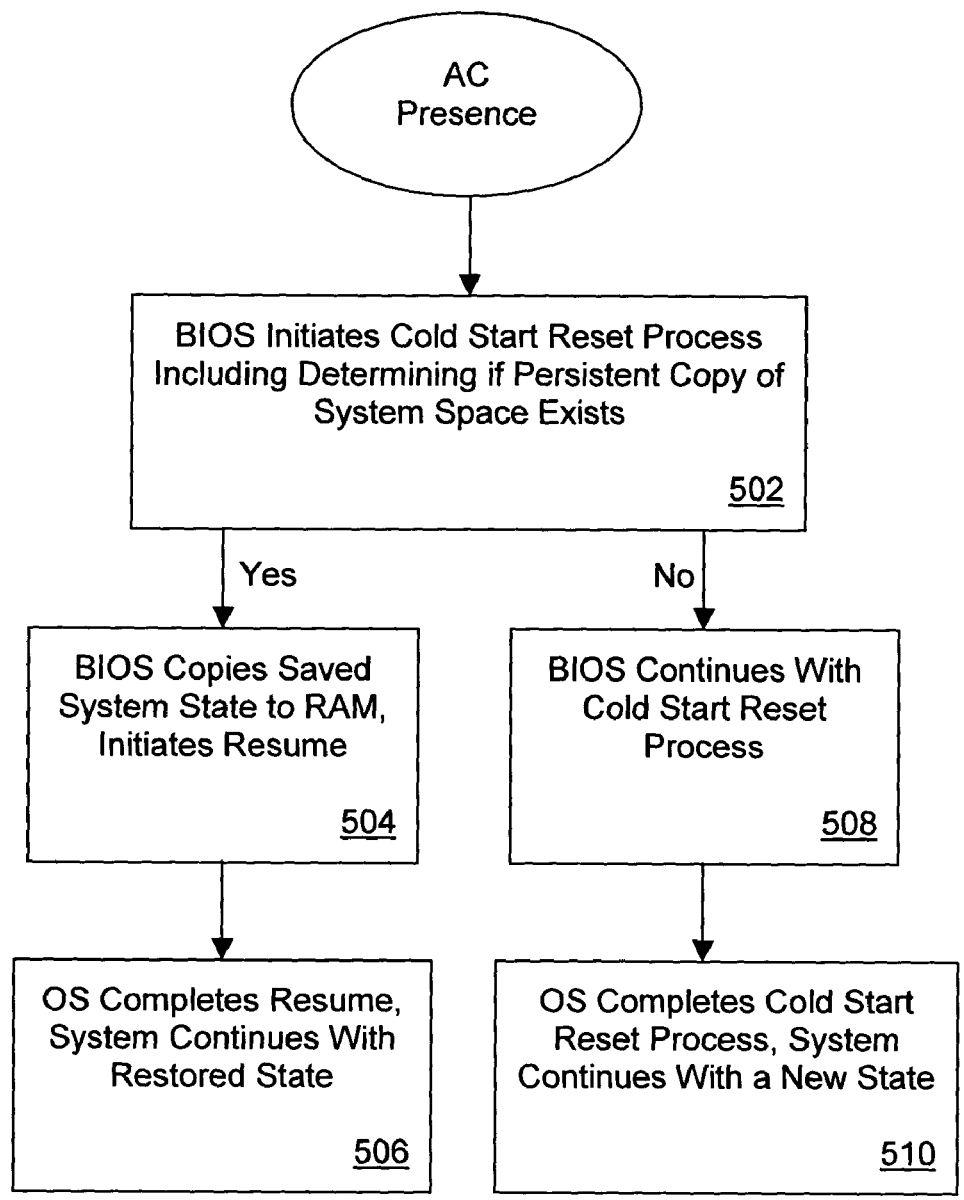
FIG. 5 illustrates one embodiment of the relevant operation flow of the system to cold start and reset the system to an active state, in responding to an AC re-presence condition, while operating in an un-powered state, including conversion to a resume process employing the persistent copy of the saved system state if available.

FIG. 5 illustrates the relevant operation flow of system 100 in responding to an AC re-presence condition, while operating in un-powered state (G3) 206. For the embodiment, when AC is re-present at power supply 116, the event causes a cold start reset for system 100. Accordingly, BIOS 124 is given control, and it starts the cold start process to initialize various hardware elements. As part of the cold start process, BIOS 124 determines whether a persistent copy of the system state exists, block 502.

If a persistent copy of the system state exists, BIOS 124 copies the persistent copy of the system state into memory 106, block 504. BIOS 124 then continues with operations similar to the operations performed under a resume process, resulting in OS 126 completing the resume process, and system 100 continues operation, starting from the restored system state in memory 106, block 506.

However, if a persistent copy of the system state is not found, BIOS 124 continues with the cold start process, performing various initializations of hardware elements, and then transfers to OS 126, block 508. At such time, OS 126 completes the cold start process, and system 100 continues operation, starting from a new system state in memory 106, block 510.

Thus, it can be seen from the above description, a method to preserve operational state in the absence of AC has been described. In particular, embodiments of system 100 may be maintained in a suspended-to-memory state from a DC power source, for at least a period, during AC absence, sufficient to allow the persistent copy of the system state to be made. As a result, embodiments of system 100 may be returned to the system state saved when AC is returned.

As described earlier, the feature is particularly useful in offering the user of a computing device, usability experience that is more similar to conventional consumer electronic devices, such as a television.

While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. In an apparatus, a method of operation comprising:
   in response to an AC failure condition of the apparatus, supplying power from a backup power source to the apparatus for at least a time period;
   additionally initiating a suspend process to place the apparatus in a suspended to memory state in system memory, to be sustained by the supplied backup power;
   intervening and preserving a persistent copy of an operational state of the apparatus, before completing the suspend process and placing the apparatus in the suspended to memory state, sustained by the supplied backup power; and
   receiving an interruption interrupting the preserving of the persistent copy, and in response, aborting the preserving, and completing the suspend process, placing the apparatus in the suspended to memory state, sustained by the supplied backup power.

2. The method of claim 1, wherein the suspend process is initiated by an operating system (OS) of the apparatus, and comprises the OS instructing a controller of the apparatus to shut off delivery of normal power within the apparatus, leaving only delivery of standby power within the apparatus.

3. The method of claim 2, wherein
   the OS instructing comprises the OS attempting to write to a register of the controller; and
   the intervening comprises the controller in response to the OS attempted write, causing a basic input/output system (BIOS) to perform the preservation of the operational state of the apparatus.

4. The method of claim 1, wherein
   the intervening comprises transferring control to an input/output system (BIOS) of the apparatus; and
   the preserving comprises the BIOS saving the operational state of the apparatus to a persistent storage.

5. The method of claim 1, wherein the method further comprises
   monitoring for absence of AC to a power supply of the apparatus; and
   generating a signal indicating AC failure on detection of absence of AC to the power supply.

6. The method of claim 5, wherein the monitoring and generating are performed by the power supply.

7. The method of claim 1, wherein the suspended to memory state in system memory, results in the system memory of the apparatus having a suspended operational state of the apparatus, and wherein the method further comprises:
   monitoring for re-application of AC to the apparatus while the apparatus is in the suspended to memory state maintained by the backup power source; and
   resuming the apparatus to an active state on re-application of AC to the apparatus, where the apparatus continues operation, starting from the operational state previously suspended in the system memory.

8. The method of claim 7, wherein
   the method further comprises signaling a controller of the apparatus on re-application of AC to the apparatus while the apparatus is in the suspended to memory state;
   handling the signaling by the controller as a device wake event, causing a basic input/output system (BIOS) of the apparatus to gain control; and
   the BIOS initiating a resume process, and transferring control to an operating system (OS) of the apparatus to complete the resume process, transition the apparatus from the suspended to memory state to the active state, and continue operation of the apparatus, starting from the previous suspended operational state in the system memory.

9. The method of claim 8, wherein the signaling of the controller is performed by a power supply of the apparatus.

10. A system comprising:
    a system memory to store at least a current operational state of the system;
    a persistent storage;
    a power supply including a backup power source, coupled to the system memory, to source power to the system memory to sustain the suspended to memory state for at least a time period during an AC failed condition;
    a basic I/O system (BIOS) operatively coupled to the system memory and the persistent storage, to intervene and preserve a persistent copy of the operational state of the system in the persistent storage and the system memory, before completing a suspend process initiated by an operating system (OS) to place the system in the suspended to memory state in the system memory, to be sustained by the backup power source; and
    a controller operatively coupled to the OS to cause the OS to initiate the suspend process by way of an interrupt interrupting the preserving of the persistent copy, wherein the controller is equipped to abort the preserving in response to the interrupt, and complete the suspend process, to place the system in the suspended to memory state in the system memory, when the system is in the AC failed condition.

11. The system of claim 10, wherein
    the system further comprises a processor and the OS; and
    the controller comprises a register to which the OS writes to initiate the suspend process to place the system in the suspended to memory state, and the controller is equipped to cause the BIOS to gain control, to enable the BIOS to intervene, in response to an attempted write to the register by the OS.

12. The system of claim 10, wherein the system further comprises a power supply coupled to at least the controller, to monitor for presence of AC, and generate a signal indicating AC failure on detection of absence of AC.

13. The system of claim 10, wherein the system further comprises a networking interface operatively coupled to the BIOS.

14. The system of claim 10, wherein the BIOS is operatively coupled to the OS, and equipped to initiate a resume process and transfer to the OS to continue and complete the resume process, and place the system in an active state, where the system continues operation, starting from the previously suspended operational state of the system in the system memory, and wherein the controller is operatively coupled to the BIOS to cause the BIOS to initiate the resume process on re-application of AC to the system.

15. The system of claim 14, wherein the power supply is further equipped to signal the controller on re-application of AC to the system;

the controller is equipped to handle the signaling as a device wake event, causing BIOS to gain control; and the BIOS is equipped to initiate the resume process, upon gaining control.

* * * * *